Oct. 19, 1937.  Y. KOIKE  2,095,986
INSECT TRAP
Filed Aug. 8, 1936    2 Sheets-Sheet 2
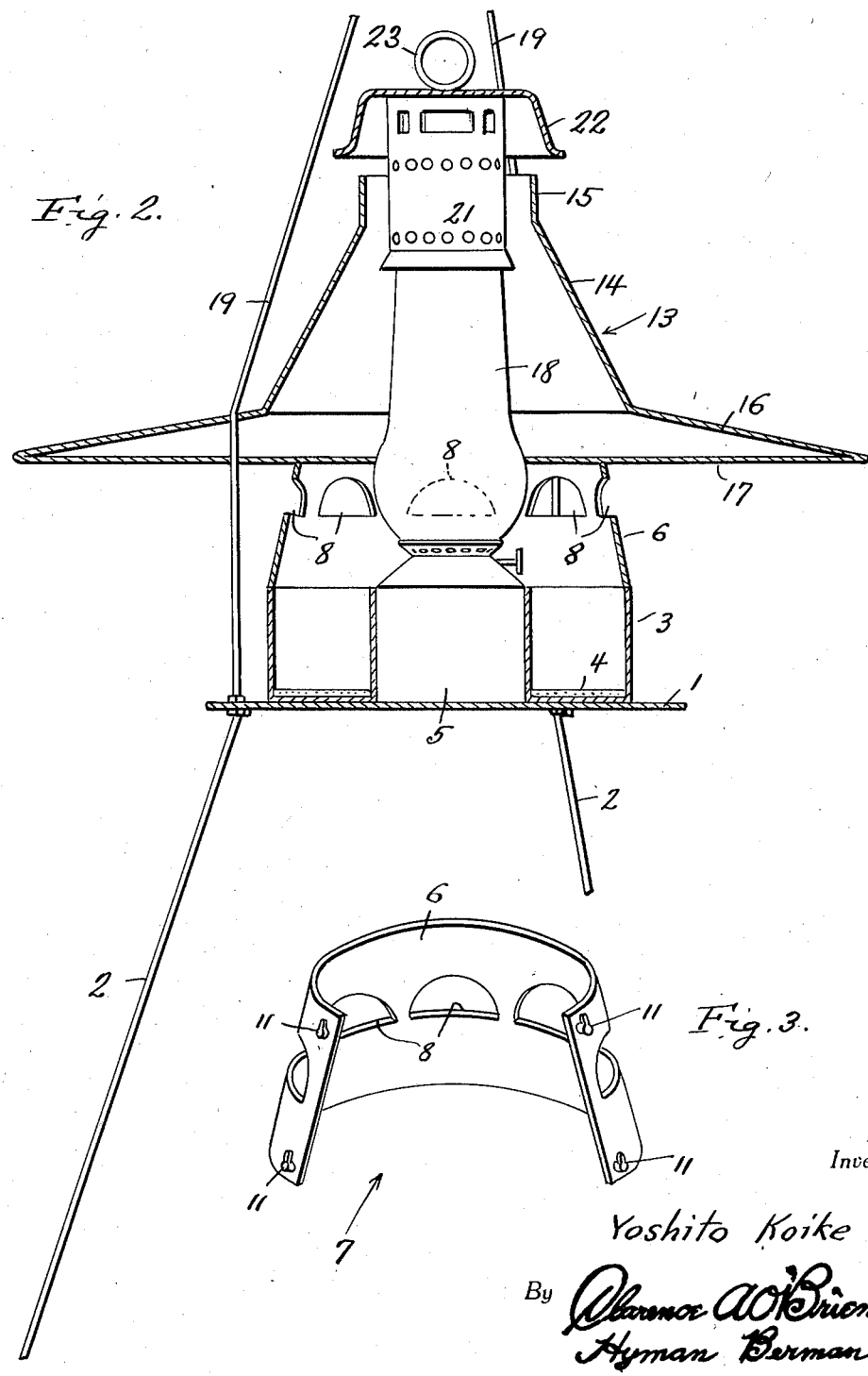
Inventor
Yoshito Koike
By Clarence A. O'Brien
Hyman Berman
Attorneys Patented Oct. 19, 1937

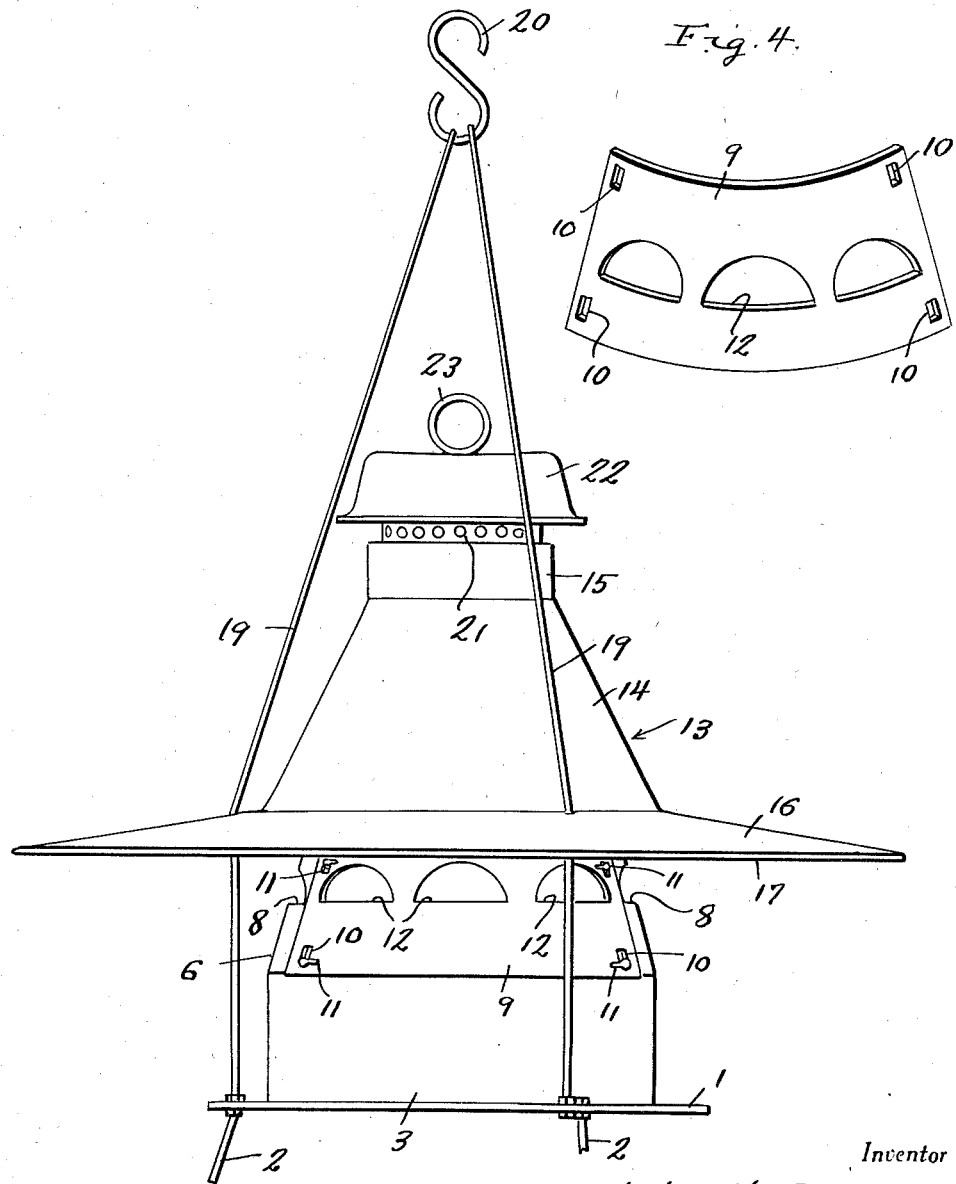

2,095,986

UNITED STATES PATENT OFFICE 2,095,986

INSECT TRAP

Yoshito Koike, Santa Ana, Calif.

Application August 8, 1936, Serial No. 95,026

4 Claims. (Cl. 43—113)

The present invention relates to new and useful improvements in insect traps and has for its primary object to provide, in a manner as hereinafter set forth, a device of this character embodying a novel construction, combination and arrangement of parts through the medium of which flying insects will be attracted thereto and destroyed.

Other objects of the invention are to provide an insect trap of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of the invention.

Figure 2 is a view in vertical section through the device.

Figure 3 is a detail view in perspective of the apertured member through which the insects enter the trap.

Figure 4 is a detail view in perspective of the removable closure plate which is mounted on the member shown in Figure 3.

Referring now to the drawings in detail, it will be seen that the embodiment of the invention which has been illustrated comprises a base 1 in the form of a flat metallic disk which is mounted on a plurality of downwardly diverging supporting legs 2. Mounted on the base 1 is an annular trough or pan 3 in the bottom of which an absorbent pad 4 of suitable material is provided. The annular trough 3 is for the reception of a suitable greasy or waxy substance for retaining and destroying the insects as they drop thereinto.

Also mounted on the base 1 is a conventional lamp 5 which is encircled by the annular trough 3. Secured as by soldering or welding on the annular trough 3 is a substantially frusto-conical member 6 which, as illustrated to advantage in Figure 3 of the drawings, is split in a manner to provide an opening through which access may be had to the lamp 5, said opening being designated by the reference numeral 7. The member 6 has formed therein a plurality of substantially segmental openings 8 through which the insects enter, being attracted by the lamp 5. An arcuate closure plate 9 is provided for the opening 7, said closure plate having slots 10 in its corner portions which accommodate securing buttons 11 which are rotatably mounted on the member 6. The closure plate 9 is provided with openings or apertures 12 which are similar to the openings or apertures 8.

The reference numeral 13 designates generally what may be referred to as a shade which is mounted on the substantially frusto-conical member 6. The shade 13 includes a frusto-conical portion 14 terminating, at its upper end, in a cylindrical neck 15. Projecting from the lower end of the portion 14 of the shade 13 is a substantially frusto-conical flange 16 from which a supporting plate 17 extends inwardly for engagement on the member 6. The plate 17 has formed therein a centrally located circular opening which accommodates the chimney 18 of the lamp 5.

Suspension rods 19 extend through the portions 16 and 17 of the shade 13 and have their lower ends anchored in the base 1. From the portion 16 of the shade 13 the suspension rods 19 converge toward their upper ends where they are connected to a hook 20. Mounted on the chimney 18 of the lamp 5 is an apertured tube 21 which projects above the shade 13 and which has mounted on its upper end a cap or the like 22. Fixed on the cap 22 is a ring 23 which functions as a handle. As illustrated to advantage in Figure 2 of the drawings, the cap 22 is spaced above the upper end of the shade 13 and extends outwardly beyond the cylindrical neck portion 15 of said shade.

It is thought that the operation of the device will be readily apparent from a consideration of the foregoing. To light the lamp 5 the closure plate 9 is removed. Of course, after the lamp 5 has been lighted the closure plate 9 is replaced on the substantially frusto-conical member 6. Insects which are attracted by the light enter the trap through the inlet openings 8, strike the lamp 5 and drop into the annular trough or pan 3 where they are retained and destroyed. The construction and arrangement is such that the device may either be suspended from a suitable support or mounted on the ground or any other supporting surface.

It is believed that the many advantages of an insect trap constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. An insection trap comprising a base, an annular trough mounted on said base, a lamp mounted on the base and encircled by the trough, a substantially frusto-conical member mounted on the trough and encircling the lamp, said member having openings therein for the entrance of insects, and a shade mounted on said member and closing the same at the top thereof.

2. An insect trap comprising a base, an annular trough mounted on said base, a lamp mounted on the base and encircled by the trough, a substantially frusto-conical member mounted on the trough and encircling the lamp, said member having openings therein for the entrance of insects, and a shade mounted on said member and closing the same at the top thereof, said shade including a substantially frusto-conical portion, a substantially cylindrical neck rising from the upper end of said substantially frusto-conical portion, a substantially frusto-conical flange extending from the lower end of said substantially frusto-conical portion, and a plate extending inwardly from the outer periphery of said flange and engaged on the upper end of said member, said plate having a centrally located circular opening therein accommodating the lamp.

3. An insect trap of the class described comprising a base, a substantially annular trough mounted on said base, a lamp mounted on the base and encircled by the trough, a substantially frusto-conical member mounted on the trough and having openings therein for the entrance of insects, a shade mounted on said substantially frusto-conical member, and suspension rods extending through the shade and anchored in the base for mounting the trap on a support, said supension rods constituting means for retaining the shade in position.

4. An insect trap of the class described comprising a base, supporting legs for said base, a lamp mounted on the base, an annular trough mounted on said base and encircling the lamp, a substantially frusto-conical member mounted on the trough and having openings therein for the entrance of insects, said member further being split for providing an opening for access to the lamp, an arcuate closure plate for the last-named opening mounted on said member, said plate having slots therein, buttons rotatably mounted on the member and engageable in the slots for removably securing the closure plate in position, and a shade mounted on said member and closing the same at the top thereof.

YOSHITO KOIKE.